United States Patent [19]
Potter

[11] 3,728,617
[45] Apr. 17, 1973

[54] ELECTRICAL TOOL CIRCUIT CHECKER

[75] Inventor: William F. Potter, Mystic, Conn.

[73] Assignee: General Dynamics Corporation, St. Louis, Mo.

[22] Filed: Aug. 25, 1971

[21] Appl. No.: 174,649

[52] U.S. Cl. .................................. 324/51, 324/73
[51] Int. Cl. ...................... G01r 31/02, G01r 15/12
[58] Field of Search .................. 324/51, 73; 340/255

[56] References Cited

UNITED STATES PATENTS

| | | | |
|---|---|---|---|
| 2,858,507 | 10/1958 | Liautaud et al. | 324/51 X |
| 2,806,993 | 9/1957 | Matousek | 324/51 |
| 3,181,060 | 4/1965 | Hull | 324/51 |
| 3,611,133 | 10/1971 | Tsergas | 324/51 |
| 3,368,146 | 2/1968 | Regan et al. | 324/51 |
| 3,643,157 | 2/1972 | Ettelman | 324/51 X |
| 3,648,163 | 3/1972 | Pinner et al. | 324/51 |

FOREIGN PATENTS OR APPLICATIONS

| | | | |
|---|---|---|---|
| 917,436 | 9/1954 | Germany | 324/51 |

*Primary Examiner*—Gerard R. Strecker
*Attorney*—William C. Everett

[57] ABSTRACT

An electrical tool circuit checker is provided which tests the connection of the tool case to ground, checks for a short circuit to ground, and checks the operation of the tool while power is applied to determine the running AC circuit leakage to ground. Circuits are also provided to require the tester in each case to test for ground connection first before conducting other tests.

5 Claims, 1 Drawing Figure

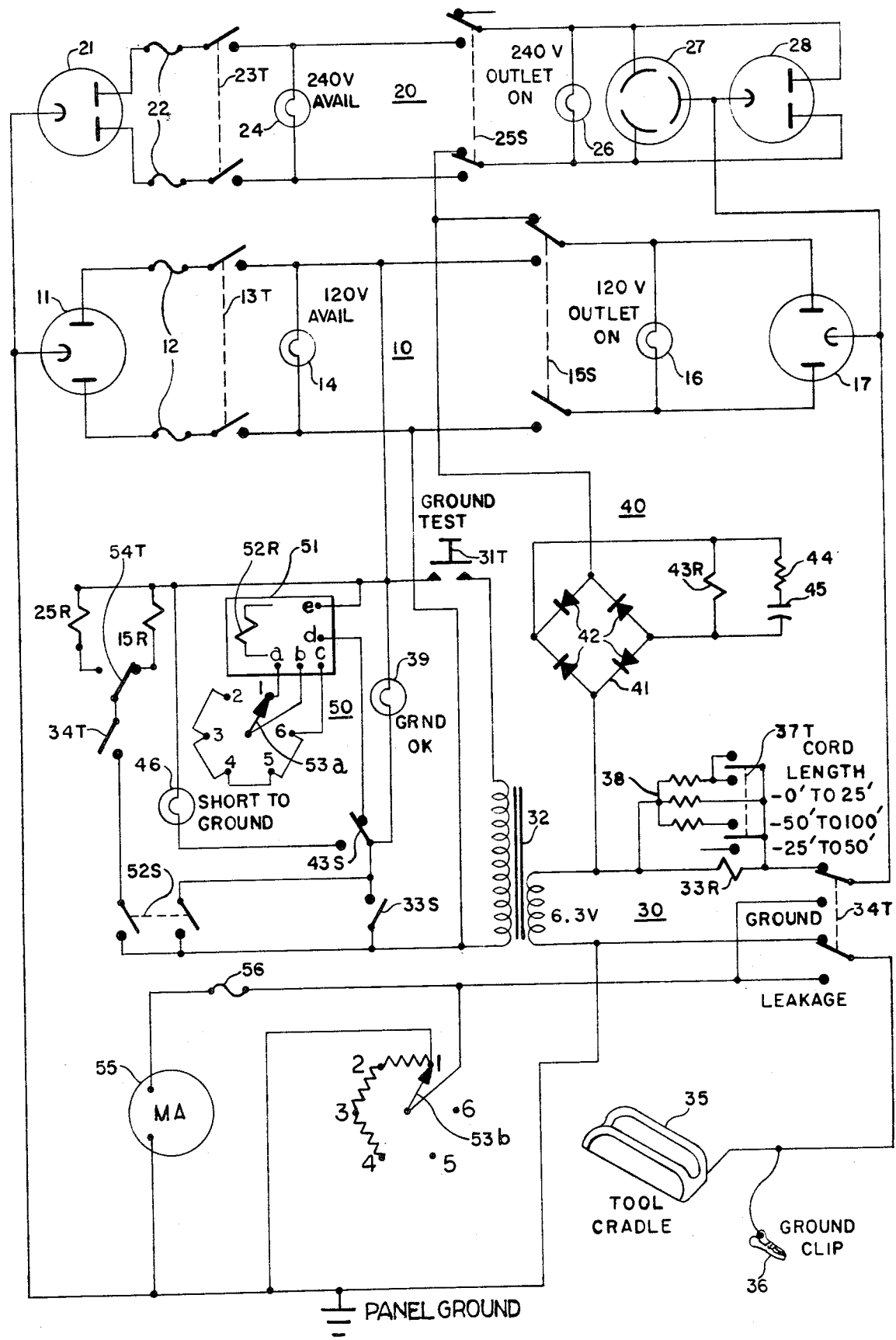

ELECTRICAL TOOL CIRCUIT CHECKER

The present invention is concerned with a device for testing electrical tools which are suspected of having shorts or faulty ground connections or especially high current leakage to ground during operation.

Electrical tools which are used often and receive considerable abuse sometime develop faults in their electric circuitry which make them hazardous for the user. Assuming that there is a connection from the case of the tool to a grounding wire which leads through the power cord to a ground prong on the tool's plug, it sometimes happens that the case becomes disconnected from this ground wire and the protection from accidental electric shock which the ground wire is supposed to provide is lost. It also happens frequently in conjunction with the loss of ground connection that the electrical tool circuit will develop a short to the case of the tool. The tool then becomes extremely hazardous to the user. There have long existed devices in the prior art capable of testing a tool for a short to ground condition or a ground lead disconnected condition.

More recently it has been recognized that a lesser but still serious danger that a tool presents is one of leakage of current to the case due to the inherent capacitance present in the tool or due to faults in the circuitry not quite amounting to a short to the case. There have been testing circuits in the prior art for testing this condition in a static state. For example, Behr U.S. Pat. No. 3,141,128 provides a circuit for applying an AC current between one of the power connections and ground. By testing the current passage in this circuit, Behr tests the inherent capacitance of the motor in its static state.

More recently, however, it has been discovered that in many tools the leakage current which occurs while the tool is actually in operation, may be 50 to 100 times the leakage that occurs in the static condition, so that a tool which might, for example, test out safely on the circuit of Behr, might prove to have a substantially higher leakage current to case when the tool was actually operated. This leakage current might be large enough to exceed the so-called "let go" current, which is a current generally between 6 and 9 milliamperes, above which the body muscles are unable to be controlled and the human hand finds itself unable to disengage itself from the tool with the resulting serious injury from lengthy exposure to the leakage current. Tools which have had leakage currents far short of the amount producing immediate fatality have produced serious damage due to the inability of the operator to let go, and this leakage current in some cases could not be tested because circuits only existed to test it in a static state.

The present invention solves this difficulty by providing a circuit linked to the ground prong of the tool and to its case to test directly the leakage current occurring in the tool while it is turned on. Other circuitry is also provided to require the operator in each case to test the ground condition and for short to ground before he can make a test of the leakage current of the tool. Further circuitry is provided to insure that the power to the tool will cut off automatically ten seconds after meter testing has begun.

Accordingly, it is an object of the invention to provide an electrical tool testing circuit capable of testing ground condition, short to ground and leakage current in operating condition.

It is another object of the invention to provide a foolproof electrical tool testing circuit in which the operator cannot test for leakage current until he has made a preliminary check for ground condition and short to ground.

It is yet another object of the invention to provide an electrical tool testing circuit which protects the operator and the meter in the leakage current testing mode by shutting off automatically ten seconds after testing of leakage current has begun.

These and other objects will become apparent in the following specification when taken in conjunction with the drawing.

The FIGURE shows the circuit diagram according to the present invention.

Referring now to the figure, we have a 120 volt power circuit 10 having a plug 11 of a common type which plugs into any convenient source of 120 volt AC power. The ground prong on this plug is linked to the chassis of the box in which the testing circuit is contained so that the chassis is grounded. The power from this plug is led through fuses 12 to a double-pole, double-throw toggle switch 13T. It should be noted at this point that T following a switch numeral indicates a toggle or manually operable switch, while S indicates a switch operable by a relay. R following a numeral designates a relay coil which operates a switch. Just the other side of the toggle switch 13T is a light 14 which is intended to indicate the availability of 120 volt AC power. The power leads on further to a second double-pole, double-throw switch 15S; this one being operable by a relay coil as will be explained subsequently. When switch 15S is closed on line, a light 16 indicates that the 120 volt outlet has power on. The 120 volt outlet 17 is an outlet receptacle of common type for the plug of the power tool, assuming that the power tool is a 120 volt power tool.

Also provided for the testing circuit is a 240 volt single phase power circuit having plug 21, fuses 22, a toggle switch 23T, a light 24 indicating the availability of 240 volt power, a switch 25S operable by another relay, light 26 indicating that power is provided to the 240 volt outlet, and receptacles of either the twist lock type 27 or the straight blade type 28.

A ground testing circuit 30 is provided which is activated by a ground test toggle switch 31T which provides 120 volt AC power across the primary of a transformer 32. The secondary of transformer 32 puts out 6.3 volt AC power through a relay coil 33R and through a triple-pole, double-throw toggle switch 34T. Two of the three poles are shown in ground test circuit 30. The third will be explained subsequently. One pole of switch 34T is linked to the ground prongs of receptacles 17, 27 and 28 as shown. The other pole of switch 34T is linked to a tool cradle 35 and a ground clip 36. In parallel with relay coil 33R is a double-pole, double-throw toggle switch 37T which has a center off position. Switch 37T selects from a combination of resistances 38 to adjust for the cord length of the tool, since this affects the threshold of response of relay coil 33R. In the top position as shown, all three resistances are in parallel with relay coil 33R. This corresponds to the shortest length of cord from 0 feet to 25 feet. The middle position connects only one of the resistances in parallel. This is equivalent to the longest length of cord, 50 feet to 100 feet. The lower position as shown connects the upper two resistances in parallel with coil 33R. This is equivalent to the middle length of cord, 25 feet to 50 feet. Relay coil 33R operates switch 33S which when it closes lights green light 39, which indicates that the tool has a good ground to case.

Also connected to the secondary of transformer 32 is a short-to-ground testing circuit 40 comprising a rectifier 41 made up of diodes 42. The secondary of the rectifier is sent through relay coil 43R in parallel with resistance 44 and capacitance 45. The fourth pole of rectifier 41 is linked to one of the poles of switch 15S and one of the poles of switch 25S as shown. When relay coil 43R is activated, it moves switch 43S out of the position shown to the opposite position thereby lighting light 46 which is a red light indicating that the tool being tested has an electrical short to ground.

Also provided is a leakage current testing circuit 50. In this circuit is a time delay relay 51 having within it a relay coil 52R. The characteristic of this time delay relay 51 is that when a release provided by certain of the terminals is initiated, the relay will cut out a predetermined time after. Such a relay is of common type as shown, for example, by Potter and Brumfield No. CHB-38 or a Magnecraft W211ACPSRX-5. The Potter and Brumfield relay referred to has a 120 volt AC coil and is adjustable from 1 to 10 second delay on release. For the purposes of the present invention we select the 10 second delay on release. The 120 volt power is applied across terminals $d$ and $e$ which applies power immediately to relay coil 52R. Terminals $a$ and $b$ are shown linked together by deck 53A of a gang switch 53. As long as terminals $a$ and $b$ of relay 51 are linked together, coil 52R will be activated. When terminal $b$ is switched to connection with terminal $c$ as by moving the switch 53 around to successive positions, the relay will start timing for release and at the end of ten seconds, relay coil 52R will be de-activated. Relay coil 52R operates a double-pole, double-throw switch 52S, one pole of which is in parallel with switch 33S and the other pole of which is in series with the third pole of switch 34T and with another toggle switch 54T which is a selector of 120 or 240 volt power. Finally in series with these switches is either the relay coil 15R or relay coil 25R, which operate respectively switches 15S or 25S to apply either 120 or 240 volt power to the respective receptacles.

When toggle switch 34T is moved to its lower position for the leakage current test, both the case of the tool and the ground plug of the corresponding receptacle are linked to ground through the second deck 53b of switch 53. Switch 53 is a two-deck, six-position manual switch. In the first position as shown, the case and ground plug are linked directly to ground. In successive positions of switch 53, greater and greater resistances are placed in line between the ground of the tool and the panel ground. In parallel with deck 53 and its resistances are a fuse 56 and a milliammeter 55 which shows the result of the testing for leakage current.

The operation of the electrical tool testing device is easily seen. The tool is plugged into the appropriate receptacle, either receptacle 17, 27 or 28 as the case may be. In the case of a 120 volt tool, only plug 11 need be plugged into an outlet. In the case of a 240 volt single phase tool, both plugs 11 and 21 must be plugged in, plug 21 to provide the 240 volt power and plug 11 to provide power for the testing circuit which operates on 120 volt current.

Assuming we have a 120 volt tool, toggle switch 13T is closed and light 14 comes on indicating that we have 120 volt power available. Ground test switch 31T is then pushed down providing power to the secondary of transformer 32 which provides voltage between the ground clip and ground prong of the tool. If there is a good ground connection between the ground prong of the tool power cord and its case, the circuit will be complete, activating relay 33R and causing switch 33S to close, lighting ground light 39.

Assuming that switch 43S has stayed closed for reasons for which will be mentioned shortly, relay coil 52R will also be activated, thereby closing relay switch 52S. Transformer 32 also provides 6.3 volts across short-to-ground testing circuit 40 between the ground clip or case of the tool and one of the prongs of the power cord. If there is a short between the electrical circuit of the tool and the case, current will flow through rectifier 41 and then through relay coil 43R, which will cause switch 43S to switch to its opposite condition lighting up the short-to-ground light 46 and cutting off power to relay 52R.

We see therefore that the conditions for the closing of switch 52S are that the ground between the power cord and the case must be good, closing switch 33S, and there must be no short-to-ground which would open switch 43S. If these two conditions are satisfied, switch 52S will close, and when this happens, switch 33S is bypassed so that when switch 31T comes up again the leakage current testing circuit 50 will stay connected while switch 33S opens. The circuit is now ready to have power applied to test for leakage current. Toggle switch 54T is moved to the right as shown to select 120 volt circuit. If a 240 volt circuit were being tested, it would be moved to the left. Triple-pole switch 34T is moved to its lower position, which also puts power through relay 15R, thereby closing switch 15S and applying power to the receptacle 17. When this is done, the tool which has had its switch placed on at the start of the process, will begin to operate. If there is any leakage current to the case of the tool, it will pass through ground clip 36 or tool cradle 35 through switch 34T to deck 53B and milliammeter 55. In the start position this current is grounded out through deck 53B so that no current passes through milliammeter 55. In the event that the tool must be held by the operator, this also insures no current passes through his hand at start.

Testing of this leakage current is begun by moving switch 53 to successive positions around the circle. As soon as the switch moves out of position No. 1 the timing of release relay 51 begins to operate. The resistances around deck 53B are graduated such that milliammeter 55 is exposed to successive orders of magnitude of current proportional to the leakage current. The standard for rejection of a tool is a reading of 0.5 milliamps or less for 120 volt tools, or 1.0 milliamps or less for 240 volt tool. As meter switch 53 is advanced around the successive positions, it will eventually arrive at position 5 which is the read position. If there is a reading on the meter of above 0.15 milliamps for any position before the read position, the tool is rejected.

At the end of 10 seconds, relay 51 shuts down the entire circuit. The circuit cannot then be operated again until several things have taken place. Switch 53 must be returned to the first or start position in order to link terminals *a* and *b*. Also since switch 52S has dropped out, no power will reach 52R until switch 33S is closed. Switch 33S will not close again until another test of the ground condition is made by closing switch 31T. This in turn requires that switch 34T be returned to the ground test position thereby opening the third pole of switch 34T and cutting off power to relay coil 15R which in turn means that switch 15S will not go on again. It will be seen therefore that the person testing the tool must return completely to the beginning of the cycle before he can perform any part of the test again.

It will be understood that with a 240 volt tool, the operation is the same except that switch 54T is moved to its left hand position activating relay 25R at the proper time and closing switch 25S applying power to receptacles 27 and 28. With this test, however, 120 volt power is still applied to ground testing circuit 30, short testing circuit 40, and leakage current testing circuit 50 and for this reason, toggle switch 13T must still be closed, as well as switch 23T. The remainder of the operation proceeds as before.

There will be seen from the foregoing circuit that a tool's actual leakage current can be tested while the tool is running. It will also be seen that the circuit is made foolproof in that the tester cannot test the leakage current condition until he has tested the ground condition and the short-to-ground condition. It will also be seen that the circuit has an automatic cutoff once testing of the leakage current is begun thereby protecting the operator and meter against leakage current for an excessive length of time.

I claim:

1. An electrical tool testing device comprising:
   a. an electrical receptacle into which the plug of the tool may be inserted, said receptacle having a pair of openings for the AC prongs of the device and an opening for the ground prong of the tool,
   b. means to connect a source of power to said pair of openings,
   c. means to test the passage of current connected between said opening for the ground prong and a solid ground when power is applied to said pair of openings,
   d. a source of voltage,
   e. a first relay coil,
   f. a connecting means for attaching electrically to the case of the tool being tested,
   g. a switch connected between said opening for the ground prong and said means to test, which in a first position connects said opening for the ground prong to said means to test and in a second position connects said opening for the ground prong to said first relay coil, said source of voltage, and said connecting means, whereby said first relay coil gives a positive indication when there is a solid electrical connection between the ground prong and the case of the tool, and
   h. first means to disable the means to connect a source of power until said first relay coil gives a positive indication, comprising:
      i. a first relay switch closed when said first coil is activated,
      ii. an indicator light and second relay coil both activated when said first switch is closed,
      iii. a second relay switch closed when said second coil is activated and having two poles, one parallel with said first relay switch,
      iv. a third relay coil activated when the second of said two poles is closed, and
      v. a third relay switch connected between said source of power and said pair of openings and closed when said third relay coil is activated.

2. A testing device as recited in claim 1, further comprising:
   j. a fourth relay coil connected between said source of voltage and one of said pair of openings, whereby said coil is activated when there is an electrical connection of greater than a predetermined amount between the electrical circuit of the tool and the case,
   k. a fourth relay switch in series with said second relay coil and open when said fourth relay coil is activated.

3. A testing device as recited in claim 1, wherein said means to test comprises:
   i. an electric current meter; and
   ii. means having successive positions to pass successively larger portions of the current through said meter, the first position in said means shorting out said meter.

4. A testing device as recited in claim 3, wherein said second relay coil is a time delay relay coil which deactivates a predetermined time after said means to pass is moved out of its first position.

5. An electrical tool testing device comprising:
   a. an electrical receptacle into which the plug of the tool may be inserted, said receptacle having a pair of openings for the AC prongs of the tool and an opening for the ground prong of the tool,
   b. means to connect a source of power to said pair of openings,
   c. means to test the passage of current connected between said opening for the ground prong and a solid ground when power is applied to said pair of openings, comprising:
      i. an electric current meter;
      ii. means having successive positions to pass successively larger portions of the current through said meter, the first position in said means shorting out said meter;
   d. a time delay relay coil which deactivates a predetermined time after said means to pass is moved out of its first position, and
   e. a relay switch which when open disables the means to connect a source of power to said pair of openings, said switch being opened when said time delay coil deactivates.

* * * * *